US005542505A

United States Patent [19]
Kempf

[11] Patent Number: 5,542,505
[45] Date of Patent: Aug. 6, 1996

[54] TORQUE LIMITING DEVICE WITH RESTRAINING MECHANISM

[75] Inventor: Mark Kempf, Inver Grove Heights, Minn.

[73] Assignee: Vadnais Technologies Corporation, St. Paul, Minn.

[21] Appl. No.: 452,062

[22] Filed: May 26, 1995

[51] Int. Cl.⁶ ............................................. F16D 63/00
[52] U.S. Cl. ........................... 188/77 W; 16/308; 16/342; 192/8 C
[58] Field of Search ................................. 267/155, 275, 267/276, 284; 16/250, 285, 295, 308, 373, 374, 375, DIG. 33, DIG. 36, 337, 342; 160/DIG. 3; 296/97.1, 97.12, 97.13; 192/8 C, 7; 188/134, 77 W, 78, 67

[56] References Cited

U.S. PATENT DOCUMENTS

| | | | |
|---|---|---|---|
| 1,876,654 | 9/1928 | Floraday | 192/8 |
| 1,954,620 | 4/1932 | Connell | 192/56 |
| 2,510,644 | 6/1950 | McCormick | 464/40 |
| 2,533,973 | 12/1950 | Starkey | 64/30 |
| 2,595,454 | 5/1952 | Greenlee | 64/30 |
| 2,598,993 | 6/1952 | Gorske | 267/155 X |
| 3,395,553 | 4/1966 | Stout | 64/15 |
| 3,800,922 | 4/1974 | Kreissler | 188/134 |
| 4,115,918 | 9/1978 | Anderl et al. | 29/611 |
| 4,779,850 | 10/1988 | Paton et al. | 277/212 X |
| 4,995,579 | 2/1991 | Kitamura | 248/284 |
| 5,064,137 | 11/1991 | Komatsu | 242/201 |
| 5,142,738 | 9/1992 | Ojima | 16/306 |
| 5,157,826 | 10/1992 | Porter | 29/439 |
| 5,464,083 | 11/1995 | Arnold et al. | 192/8 C |

FOREIGN PATENT DOCUMENTS

| | | | |
|---|---|---|---|
| 261727 | 11/1987 | Japan | 267/155 |
| 270837 | 11/1987 | Japan | 267/155 |

OTHER PUBLICATIONS

Article by Joseph Kaplan entitled "Slip Clutches and Brakes" from *Machine Design* magazine, Jan. 22, 1959.

*Primary Examiner*—Josie A. Ballato
*Attorney, Agent, or Firm*—Kinney & Lange, P.A.

[57] ABSTRACT

A torque limiting device that includes a shaft and a wrap extending around the shaft. The wrap is frictionally engaged with the shaft, and the wrap has an inner and an outer surface. The device further includes a restraining mechanism enclosing the wrap such that there is contact between the restraining mechanism and the outer surface of the wrap, and such that the restraining mechanism prevents the wrap from rotating relative to the retraining mechanism as the shaft is rotated in either one of two opposing rotational directions.

9 Claims, 4 Drawing Sheets

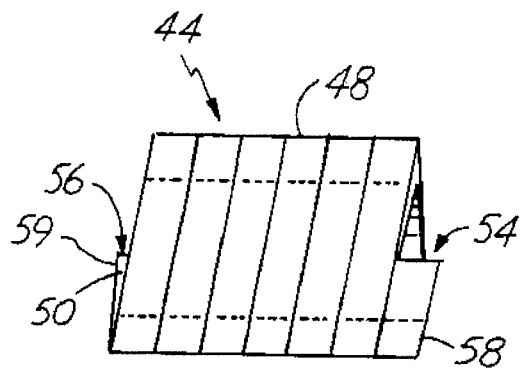
Fig. 5
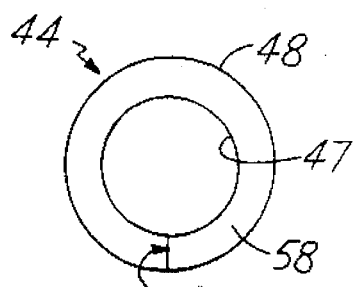
Fig. 6
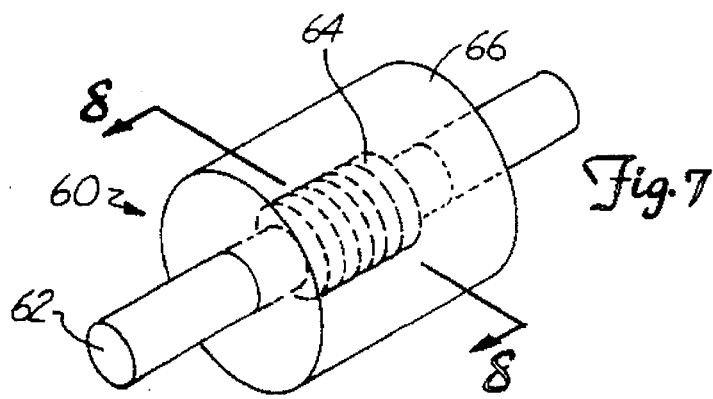
Fig. 7
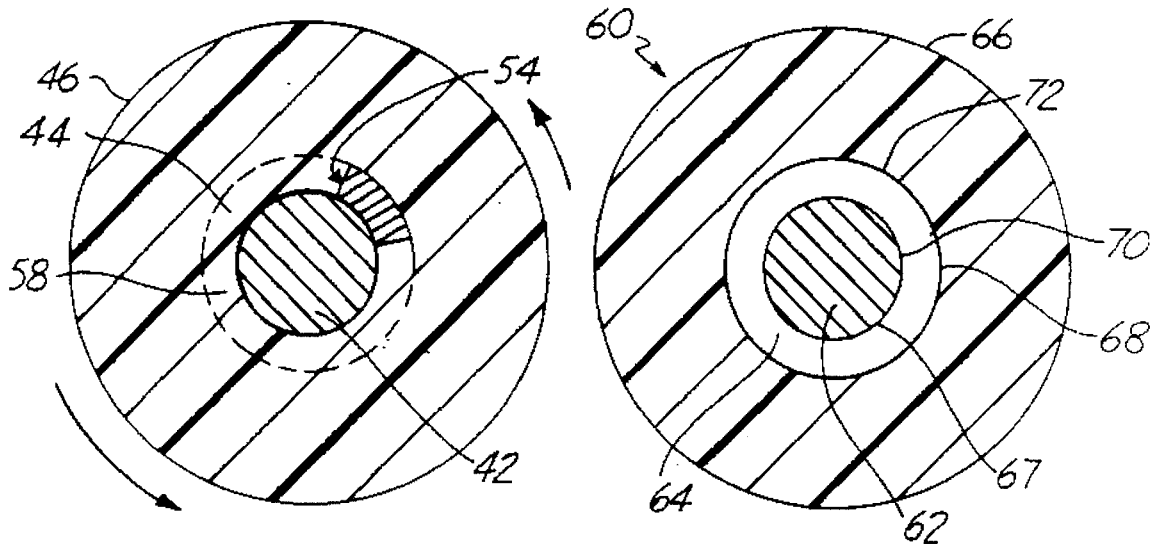
Fig 4
Fig. 8

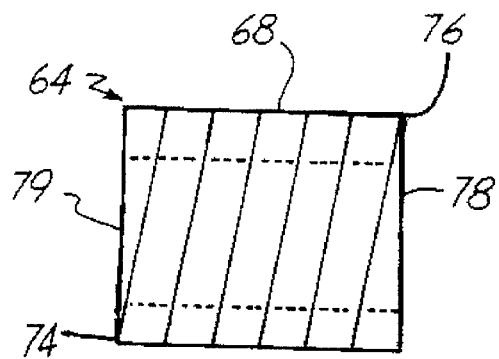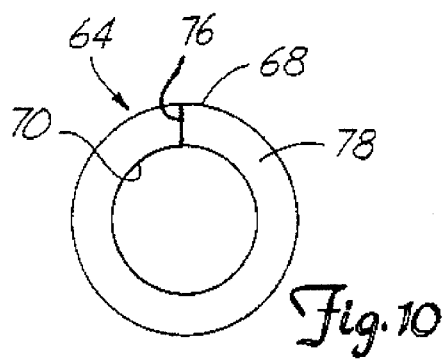

TORQUE LIMITING DEVICE WITH RESTRAINING MECHANISM

BACKGROUND OF THE INVENTION

The present invention relates to a torque limiting device. More particularly, the invention relates to a restraining mechanism which provides a relatively constant torque through a predetermined range of motion.

Torque limiting devices support objects at selected angular positions relative to a main body. An example of such a torque limiting device is a spring hinge which utilizes a helical spring wrapped around a shaft. When the shaft is rotated, one of the spring ends or toes contacts a stop or stationary support to cause the spring to slip relative to the shaft. Such a spring hinge can be designed to provide fairly constant torque or resistance to rotation throughout its range of motion. In order to provide a constant torque in these spring hinges, a wrap open is often introduced into the operation of the spring hinge. The wrap open occurs as the shaft is initially rotated. The spring toes engage the stationary support or stop to cause the spring to expand or open, i.e., "wrap open". This loosens the interference grip of the spring on the shaft and allows the shaft to be rotated relative to the spring upon application of a specified torque or force.

One of the problems with spring hinges is that a spring back is introduced into the operation of the spring hinge. Spring back is caused by the spring wrapping open during movement caused by an external torque applied to the shaft, and then wrapping back down on the shaft once the torque is removed. Spring back is also caused by the toe supporting the load. The toe will deflect as it supports the load during the movement and then relax after the load is removed. Both of these conditions cause the hinge to move the load in the opposite direction of the applied torque after the load is removed.

More particularly, when the applied torque is removed from the shaft, the spring relaxes to a more closed condition, i.e. it "wraps down" onto the shaft, causing the toes to apply a force on the stops, thereby rotating the shaft oppositely to the direction of rotation causing the wrap open. Similarly, when the applied force is removed, the toes relax from their deflected state, also rotating the shaft oppositely to the direction of rotation causing the deflection.

Prior art spring hinges also require very accurate machine tolerances. The spring toes of the spring winding must terminate precisely at the stationary support structure or stop. Inaccuracies in the spring ends will lead to additional spring back of the spring hinge. In addition, the precise location of the spring toes relative to the stop is critical to the performance of the prior art spring hinges. If the angle between the spring toe and the stop is too open, the hinge will have free play. That is, there will be no torque for a limited range until the spring toe engages the stop. In addition, if the angle between the spring toe and the stop is too closed, the toes will make the spring hover over the shaft resulting in no or low torque.

In addition, the longevity of spring hinges is compromised when grease which is typically present in the spring escapes from the hinge thereby allowing the spring hinge to wear out. Similarly, spring hinges are susceptible to rusting as most spring hinges are not enclosed and are exposed to the elements. Rusting will negatively impact the performance of the spring hinge.

The present invention solves these and other problems associated with the prior art.

SUMMARY OF THE INVENTION

The present invention is a torque limiting device comprising a shaft with a wrap extending around the shaft. The wrap is frictionally engaged with the shaft and has an inner and an outer surface. A restraining mechanism encloses the wrap to prevent the wrap from rotating relative to the restraining mechanism as the shaft is rotated about its axis. The restraining mechanism encloses the wrap and engages the outer periphery of the wrap to prevent the wrap from wrapping open.

BRIEF DESCRIPTION OF THE DRAWINGS

FIG. 4 is a section view of the wrap hinge shown in FIG. 2 taken at line 4—4 in FIG. 2.

FIG. 5 is a side view of the winding used in the wrap hinge shown in FIG. 2.

FIG. 6 is an end view of the winding shown in FIG. 5.

FIG. 7 is a perspective view of a wrap hinge according to a first modification of the present invention.

FIG. 8 is a section view of the wrap hinge shown in FIG. 7 taken at line 8—8 in FIG. 7.

FIG. 9 is a side view of the winding used in the wrap hinge shown in FIG. 7.

FIG. 10 is an end view of the winding shown in FIG. 9.

FIG. 11 is a perspective view of a wrap hinge according to a second modification of the present invention.

FIG. 12 is a section view of the wrap hinge shown in FIG. 11 taken at line 12—12 in FIG. 11.

FIG. 13 is a perspective view of the winding used in the wrap hinge shown in FIG. 11.

DETAILED DESCRIPTION OF THE PREFERRED EMBODIMENTS

Figure 1:
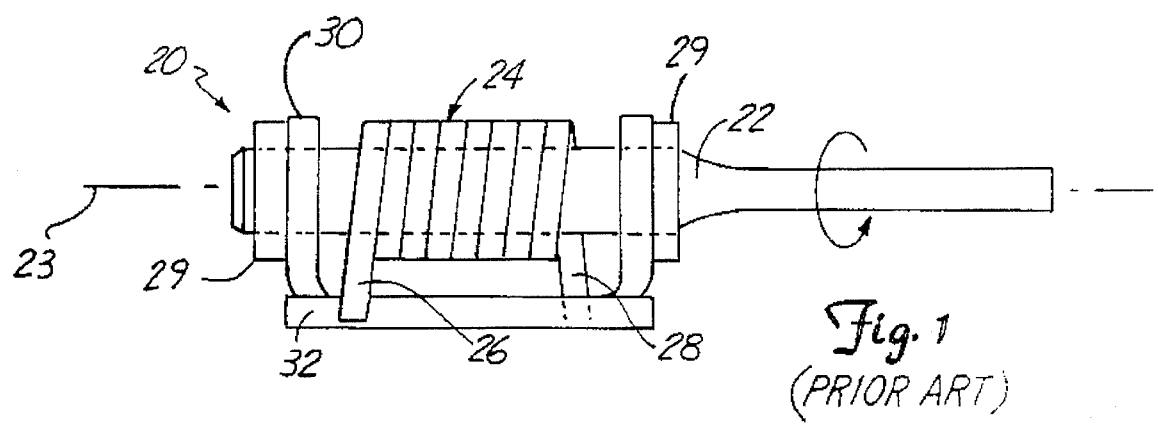
FIG. 1 is a perspective view of a prior art spring hinge.
Figure 2:
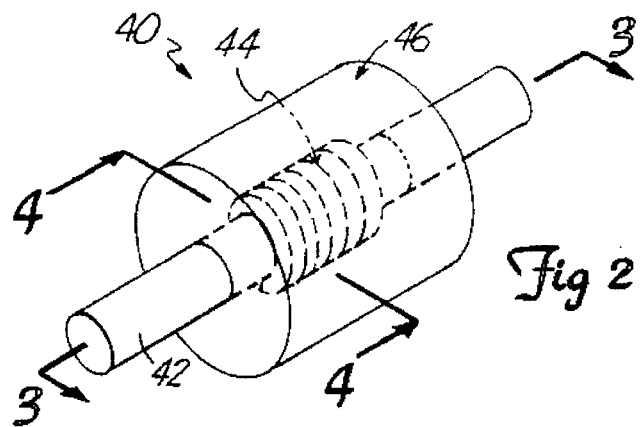
FIG. 2 is a perspective view of a wrap hinge according to a preferred embodiment of the present invention.

FIG. 1 shows prior art spring hinge 20, including shaft 22, spring 24 with first and second spring toes 26 and 28, respectively, press-on rings 29, and mounting frame 30 including stop 32. Spring 24 is interference fit around shaft 22 so that it frictionally engages therewith. Shaft 22 is rotatably supported within mounting frame 30 and held between press-on rings 29, which prevent axial movement of mounting frame 30 relative to shaft 22.

In operation, shaft 22 may be rotated about its axis 23 in either of two opposing rotational directions. As shaft 22 is rotated in the direction indicated by the arrow on FIG. 1, first spring toe 26 engages stop 32 preventing spring 24 from rotating relative to mounting frame 30. Second spring toe 28 is free of stop 32, permitting spring hinge 20 to wrap open. In this way, a fairly constant torque or resistance to movement throughout the range of motion of shaft 22 is created by the interference fit between spring 24 and shaft 22.

Similarly, rotation of shaft 22 in a direction opposite the arrow indicated on FIG. 1 causes second spring toe 28 to engage stop 32 so that spring 24 is prevented from rotating relative to mounting frame 30, while first spring toe 26 is free of stop 32. This interaction also provides fairly constant torque or resistance to movement throughout the range of motion of shaft 22.

This prior art configuration has several limitations. As the shaft is rotated and the spring toe contacts the stop, spring back is introduced into the operation of the spring hinge. Spring back is the tendency of the spring to rotate back in the opposite rotational direction as that in which the force was applied, after the force is removed from the shaft. This spring back is partially attributable to the spring toe which is engaged to the stop and will deflect as the shaft is rotated, and which reacts to the removal of force to rotate the shaft oppositely.

In addition, the tendency of the spring to "wrap open" also introduces spring back into the prior art spring hinge. "Wrap open" is the effect of the spring expanding or opening as the toe engages the stop. After the force is removed from the shaft the spring will close down on the shaft, thereby causing the shaft to rotate in the direction opposite to the applied force, that is, spring back. This is an undesirable effect.

Very strict manufacturing tolerances are required to manufacture the spring of the prior art spring hinge. Of course, the spring toes must be the appropriate length and radial position so that they both engage the stop when the shaft is rotated in either rotational direction. If the toes are too short they will not both engage the stop as the shaft is rotated, thereby preventing any torque. Moreover, the precise location of the spring toes relative to the housing is critical to the performance of the spring hinge. If the angle between the toe and the housing is too open, the hinge will have free play, that is, no torque for a limited range until the spring toe engages the stop. In addition, if the angle between the spring toe and the housing is too closed, the toe will make the spring hover over the shaft resulting in no, or very low, torque.

Prior art spring hinge 20 and similar prior art spring hinges are exposed to the outside environment. Typically, the spring is susceptible to rusting which will impede its performance. Similarly, a grease or similar lubricant used between the spring and the shaft will eventually seep out and cause wear between the spring and the shaft if exposed over time. This will also impede its performance.

FIGS. 2–6 show a wrap hinge 40 in accordance with the present invention. Wrap hinge 40 includes shaft 42, spring 44 and enclosure 46. Spring 44 is helical and includes a plurality of convolutions wrapped about shaft 42 in a controlled interference fit. Enclosure 46 is formed around spring 44 and shaft 42 so that it encloses shaft 42 and spring 44. Enclosure 46 comprises a rigid or semi-compliant material.

Figure 3:
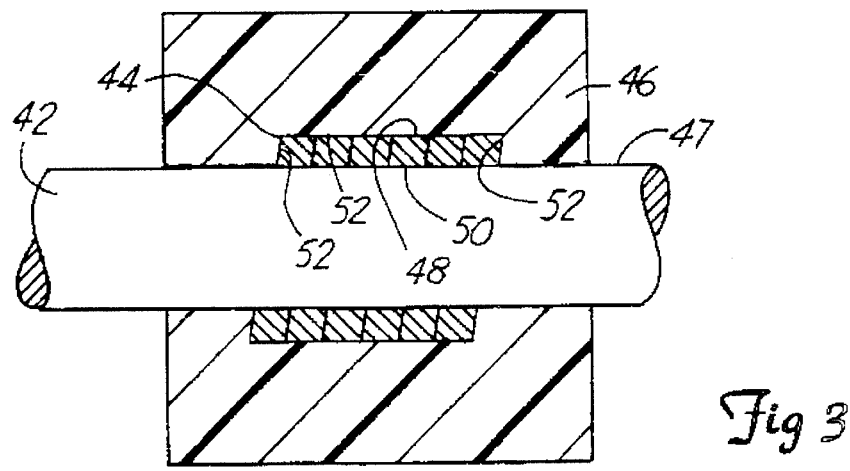
FIG. 3 is a section view of the wrap hinge shown in FIG. 2 taken at line 3—3 in FIG. 2.

As shown in FIG. 3, shaft 42 has an outer shaft surface 47 engaged by inner surface 50 of spring 44. Enclosure 46 has an inner enclosure surface 52 engaging outer surface 48 of spring 44. Spring 44 is wound about shaft 42 and encased in enclosure 46 so that outer shaft surface 47 of shaft 42 engages inner spring surface 50 by interference fit and outer spring surface 48 engages inner enclosure surface 52 by interference fit. Enclosure 46 encapsulates shaft 42 and spring 44 such that there is direct surface contact between outer spring surface 48 and inner enclosure surface 52, and between outer shaft surface 47 and inner enclosure surface 52.

As shown in FIG. 4, spring 44 is helically wrapped about shaft 42 and terminates at first spring end 54 and second spring end 56 (FIG. 5). Inner enclosure surface 52 engages spring ends 54 and 56 and spring side surfaces 58 and 59.

In operation, wrap hinge 40 is mounted to support an object at various angular positions relative to a main body. For example, enclosure 46 may be mounted above the windshield of an automobile while shaft 42 is connected to a sun visor. In this way, the sun visor may be supported at various angular positions relative to the auto windshield.

Shaft 42 is rotated in either one of two opposing rotational directions. Spring 44 is frictional engaged to shaft 42, and therefore tends to rotate with shaft 42. However, enclosure 46, having direct surface contact with outer surface 48 of spring 44, including spring ends 54 and 56, prevents spring 44 from rotating relative to enclosure 46. Moreover, there is direct contact between first spring end 54 and inner enclosure surface 52 at all times. Thus, when shaft 42 is rotated in the direction indicated by the arrow in FIG. 4, contact between first spring end 54 and inner enclosure surface 52 will prevent spring 44 from rotating relative to enclosure 46. Similarly, there is also direct contact between second spring end 56 and inner enclosure surface 52 at all times. Thus, when shaft 42 is rotated in the direction opposite to that indicated by the arrow in FIG. 4, contact between second spring end 56 and inner enclosure surface 52 will prevent spring 44 from rotating relative to enclosure 46. The friction between shaft 42 and spring 44 provides nearly constant torque or resistance to rotational movement throughout the range of motion of shaft 42.

Enclosure 46 prevents spring 44 from opening or wrapping open. Thus, as shaft 42 rotates and first spring end 54 engages enclosure 46, spring 44 is prevented from opening up by the surface contact between inner enclosure surface 52 and outer spring surface 48.

The elimination of the wrap open effect of spring 44 provides significant advantages. Because spring 44 neither wraps open nor rotates relative to enclosure 46, the amount of torque produced by wrap hinge 40 is sufficiently higher (about double) than that of a prior art spring hinge with the same dimensions. Thus, wrap hinge 40 produces more torque than a prior art spring hinge in the same size package. Also, spring 44 can be constructed of lighter gauge of material than prior art designs to obtain the same torque.

The elimination of the wrap open effect of spring 44 eradicates the spring back problems experienced in previous designs. Since there is no clearance between inner enclosure surface 52 and outer spring surface 48, there is no room for spring 44 to expand or open. Similarly, since there is no clearance between first and second spring ends 54 and 56 and inner enclosure surface 52 there is no relative rotation between spring 44 and enclosure 46. These effects combine to eliminate spring back in wrap hinge 40.

Enclosure 46 may be formed by a variety of methods. Preferably, it is formed by injection molding one of a variety of materials around shaft 42 and spring 44. The injection molding materials may include any number of thermoplastic materials that flow when heated. Such injection molding materials, include polypropylene ($C_3H_6$), high or low density polyethylene, polystyrene ($C_6H_5CHCH_2$), acetyl ($CH_3CO$), or glass-filled nylon. Alternatively, enclosure 46 may be a solid metal housing, for example aluminum or zinc, press fit around shaft 42 and spring 44.

Injection molding these materials around spring 44 and shaft 42 also provide the advantage of protecting spring 44 and shaft 42 from outside elements. Typically, the materials used in for injection molding have properties which cause them to shrink or constrict down on shaft 42. Thus, enclosure 46 and shaft 42 provide an impervious seal that keeps spring 44 and a portion of shaft 42 relatively free of environmental contaminants. The constricting force of enclosure 46 on shaft 42 also adds to the overall torque of wrap hinge 40.

Shaft 42 is preferably constructed of hardened tool steel so as to withstand the fairly demanding forces and strains it will be subjected to over its lifetime. Spring 44 is preferably made of any spring steel.

FIGS. 7–10 show a modification of a torque limiting device 60 in accordance with the present invention. Wrap hinge 60 includes shaft 62, wrap 64 and enclosure 66. Wrap 64 is helically wound about shaft 62 in an interference fit. Wrap 64 has tapered ends 74 and 76 such that ends 74 and 76 do not engage enclosure 66. Wrap 64 has one or more turns extending about shaft 62. Enclosure 66 is formed around wrap 64 and shaft 62 so that it encloses shaft 62 and wrap 64.

Alternatively, wrap 64 comprises one or more co-axial split rings wrapped about shaft 62 in an interference fit. Each split ring extends around shaft 62 on a single convolution. These co-axial split rings are directly adjacent to one another in parallel planes on shaft 62. Alternatively, wrap 64 comprises one or more single convolution spring windings. The spring windings each have one turn and are directly adjacent to one another on shaft 62.

As shown in FIG. 8, shaft 62 has an outer shaft surface 67 that engages inner surface 70 of wrap 64. Enclosure 66 has in inner enclosure surface 72 engaging outer surface 68 of wrap 64. Wrap 64 is connected about shaft 62 and encased in enclosure 66 so that outer surface 67 of shaft 62 engages inner wrap surface 70 by interference fit and outer wrap surface 68 engages inner enclosure surface 72 by interference fit. Enclosure 66 encapsulates shaft 62 and wrap 64 such that there is direct surface contact between outer wrap surface 68 and inner enclosure surface 72, and between outer shaft surface 67 and inner enclosure surface 72. Moreover, first and second wrap side surface 78 and 79 (FIGS. 9 and 10) engage enclosure 66 in an interference fit. However, wrap ends 74 and 76 do not engage enclosure 66 because they are tapered to form wrap side surfaces 78 and 79.

Enclosure 66 is formed such that it applies a radially inward force on wrap 64 and shaft 62. Enclosure 66 may be formed to accomplish this by a variety of methods. Preferably, enclosure 66 is formed by pressing an aluminum or zinc housing on wrap 64, such that it applies an inward force onto shaft 62 and wrap 64.

In operation, wrap hinge 60 is mounted to support an object at various angular positions relative to a main body. Shaft 62 is rotated in either one of two opposing rotational directions. Wrap 64 is frictional engaged to shaft 62, and therefore tends to rotate with shaft 62. However, enclosure 66 applies an inward force on wrap 64 and prevents wrap 64 from rotating relative to enclosure 66 as enclosure 66 is held stable.

FIGS. 11–13 show an alternative embodiment of wrap hinge 80 in accordance with the present invention. Wrap hinge 80 includes shaft 82, spring 84, restraining pin 85, and enclosure 86. Spring 84 is helical and wrapped about shaft 82 in an interference fit. Shaft 82 and spring 84 are frictionally engaged by interference fit. As shown in FIG. 13, spring 84 includes groove 89. Restraining pin 85 lies parallel to shaft 82 and in groove 89 of spring 84. Enclosure 86 is formed around restraining pin 85, spring 84, and shaft 82 so that it encloses restraining pin 85, shaft 82 and spring 84.

In operation, wrap hinge 80 is mounted to support an object at various angular positions relative to a main body. Shaft 82 is rotated in either one of two opposing rotational directions. Spring 84 is frictional engaged to shaft 82, and therefore tends to rotate with shaft 82. However, restraining pin 85, which lies in groove 89 and is enclosed in enclosure 86, prevents spring 84 from rotating relative to enclosure 86. The friction between shaft 82 and spring 84 provides nearly constant torque or resistance to rotational movement throughout the range of motion of shaft 82.

Figure 14:
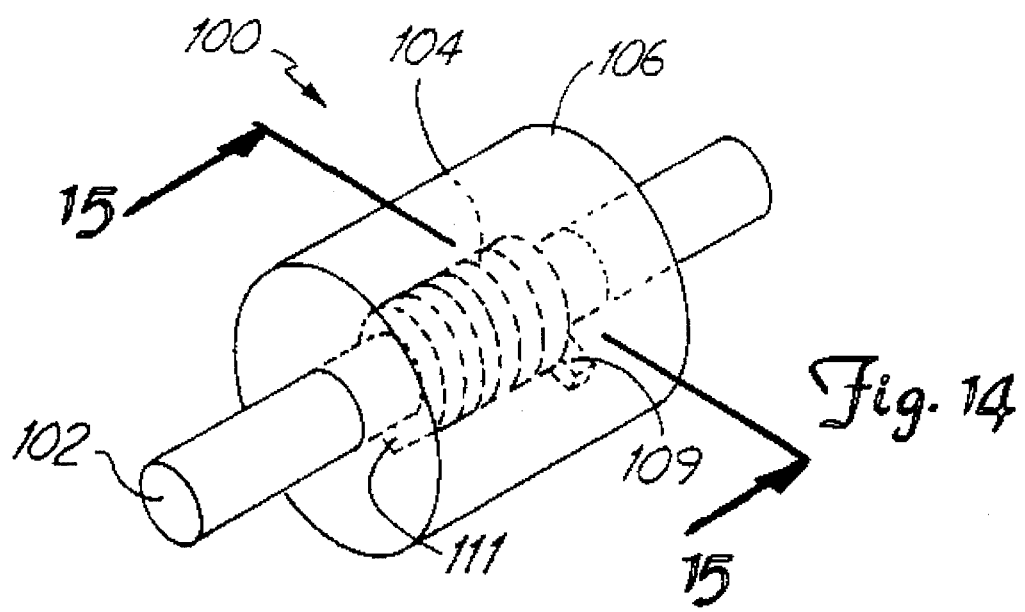
FIG. 14 is a perspective view of a wrap hinge according to a third modification of the present invention.
Figure 15:
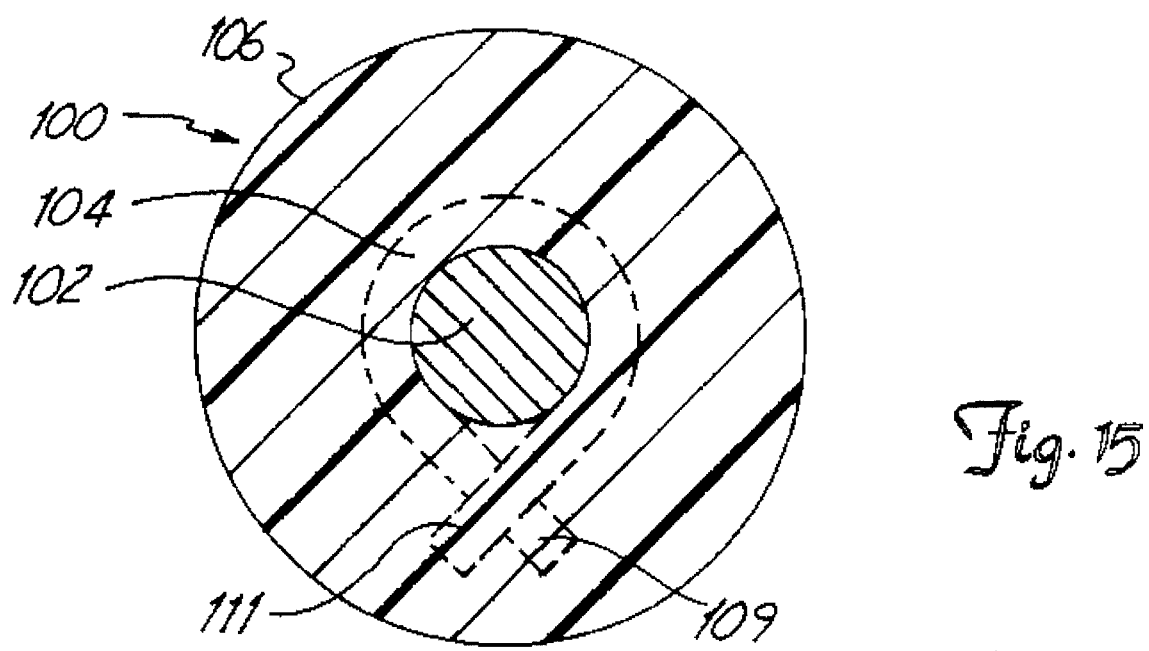
FIG. 15 is a section view of the wrap hinge shown in FIG. 14 taken at line 15—15 in FIG. 14.

FIGS. 14 and 15 show an alternative embodiment of wrap hinge 100 in accordance with the present invention. Wrap hinge 100 includes shaft 102, spring 104 and enclosure 106. Spring 104 includes spring toes 109 and 111. Enclosure 106 is formed around spring 104, spring toes 109 and 111, and shaft 102 so that it encloses spring 104, spring toes 109 and 111, and shaft 102.

Spring toes 109 and 111 extend tangentially from spring 104 and are enclosed by enclosure 106. Spring toes 109 and 111 aid in preventing spring 104 from rotating relative to enclosure 106 as shaft 102 is rotated in one of two opposing rotational directions.

Spring toes 109 and 111 of wrap hinge 100 provide advantages over springs without toes. Springs with toes are easier to manufacture in that the springs are often manufactured with toes that need to be removed, adding time and expense to the process. In addition, spring toes 109 and 111 tend to spread the forces between spring 104 and enclosure 106 as shaft 102 is rotated. Rather than being concentrated at a spring end (as in first spring end 54 in FIGS. 4–6), forces are spread over the entire length of spring toes 109 and 111.

Although the present invention has been described with reference to preferred embodiments, workers skilled in the art will recognize that changes may be made in form and detail without departing from the spirit and scope of the invention.

What is claimed is:

1. A torque limiting device comprising:

a shaft having a longitudinal axis;

a wrap extending around the shaft such that the wrap is frictionally engaged with the shaft, the wrap having an inner and an outer surface; and restraining means engaging the outer surface of the wrap at all stages of operation of the torque limiting device to prevent the wrap from rotating relative to the retraining means as the shaft is rotated about its axis.

2. The torque limiting device of claim 1 wherein the wrap comprises a spring with a first and a second end and at least one convolution around the shaft.

3. The torque limiting device of claim 2 wherein the restraining means has an inner surface in direct contact with the outer surface of the spring such that the spring is prevented from wrapping open when torque is applied to the shaft.

4. The torque limiting device of claim 2 wherein the first and the second end include toes extending into the restraining means.

5. The torque limiting device of claim 2 wherein the restraining means encapsulates the spring such that the first and second ends of the spring are immobilized when the shaft is rotated about its axis.

6. The torque limiting device of claim 2 wherein the restraining means engages the first and second ends such that the first and second ends are immobilized when the shaft is rotated and wherein the restraining means extends longitudinally along the shaft to prevent the spring from wrapping open.

7. The torque limiting device of claim 1 wherein the restraining means comprises a thermoplastic material.

8. The torque limiting device of claim 1 wherein the restraining means is an enclosure formed by injection molding a material around the wrap, selected from the group of materials comprising polypropylene, high density polyethylene, low density polyethylene, polystyrene, glass-filled nylon, and acetyl.

9. The torque limiting device of claim 1 wherein the restraining means extends longitudinally along the shaft to prevent the wrap from wrapping open.

* * * * *